3,281,403
METAL-CONTAINING POLYMER PREPARED FROM CARBONYL AND INERT GAS MIXTURES
Thomas A. Manuel, Westfield, and Martin Berger, East Brunswick, N.J., assignors to Esso Research and Engineering Company, a corporation of Delaware
Filed Apr. 23, 1965, Ser. No. 450,488
7 Claims. (Cl. 260—94.7)

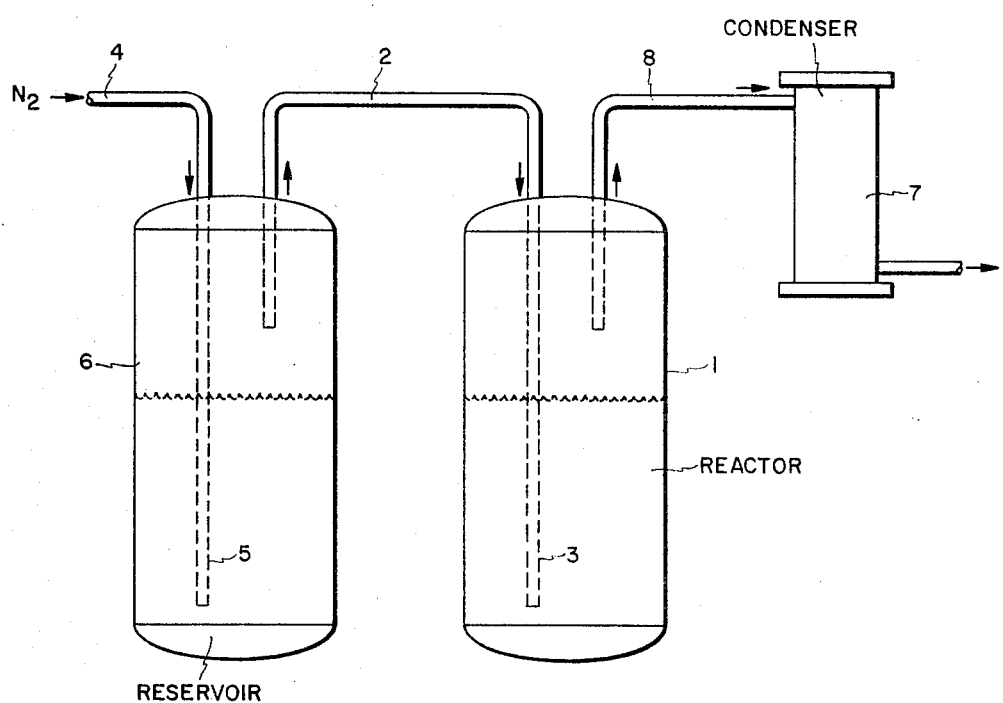

This application is a continuation-in-part of Serial No. 201,260, filed June 11, 1962, and now abandoned, which, in turn, is a continuation-in-part of Serial No. 176,131, filed February 27, 1962, and now abandoned, which applications are incorporated herein by reference.

This invention relates to methods of preparing metallic-organic polymer compositions, the compositions per se and their uses. In particular, the present invention relates to improved methods of synthesizing metal-containing polymers which are formed from unsaturated hydrocarbon polymers. Even more particularly, the invention relates to the synthesis of metal-containing polymers from carbon-to-carbon, ethylenically unsaturated, homopolymers and copolymers such as polybutadiene, styrene-butadiene copolymer, natural rubber, butyl rubber and the like. In great particularity, the invention relates to improved synthesis techniques to produce reaction products of metal carbonyls and unsaturated polymers which are either solid or liquid in form and have magnetic properties.

In commonly assigned copending application Serial No. 332,302, which is also incorporated herein by reference, it was disclosed that magnetic polymers could be synthesized by techniques involving the reaction of certain metal carbonyls with unsaturated polymers in the presence of a magnetic field. A process for synthesizing metal-organic polymers from metal carbonyls and unsaturated polymers has now been discovered and forms the essence of this invention. The synthesis of this invention does not require the presence of a magnetic field other than the normal earth field.

By following the improved technique of the instant invention, organic-metallic polymer reaction products of metal carbonyls and unsaturated polymers can be easily and conveniently prepared which has improved properties and can be either magnetic or nonmagnetic as desired.

The metallic-organic polymers prepared by the technique set forth in Serial Numbers 332,302 and 201,260 are excellent materials but have several disadvantages. The primary disadvantage is lack of reproducible results. Also, the products often contained metal polymer aggregates greatly differing in size ranges, as for instance, particle of 100 A. in diameter to chains of several microns in length. The material tended to sludge out of solution as the length of the chains increased.

For some applications such as for light modulation described and disclosed in copending Serial No. 336,339, which is incorporated herein by reference, the metal polymer products which have magnetic properties are used. For this use as well as others, a uniform particle size is desired since uniformity will result in a flatter frequency response curve in modulation. Moreover, smaller particles will form more stable dispersions than larger ones. Thus, it is particularly desirable that dispersions be prepared having uniform particle sizes where the particles are quite small. Neither one of these important criteria was possible to achieve using the techniques of the said 332,302 and 201,260 applications.

Moreover, it had been thought necessary to use large amounts of excess iron carbonyl in the synthesis of the metal-organic polymers. Actually, the use of large excesses of carbonyl results in a reaction mixture having relatively low boiling points and thus, consequently, requires a relatively long synthesis time to prepare even low concentrations of metal-organic polymers. From a theoretical standpoint, the continuously varying concentration of metal carbonyl results in temperature instabilities which, in turn, gives rise to autocatalytic effects which further gives rise to accentuated differences in reaction rates.

An additional disadvantage of the prior synthesis techniques was that the reaction mixture also contained excess iron carbonyl after the heating step terminated. This necessitated an additional distillation step to remove the carbonyl since it is such a toxicity hazard and also is an expensive material which desirably should be recovered.

In general, the new technique of the invention is described as follows:

With reference to the schematic of the drawing, a solution of unsaturated polymer in hydrocarbon solvent is charged into cylindrical reactor 1. Metal carbonyl and inert gas are introduced into cylindrical reactor 1 through tube 2 which has a gas dispersing tip 3 which extends to the bottom of reactor 1. An inert gas under pressure is blown through tube 4 which has a gas dispersing tip 5. Tip 5 extends to the botom of reservoir 6 which contains liquid metal carbonyl. The inert gas picks up some carbonyl vapors and the mixture of carbonyl and inert gas is conveyed to the bottom of reactor 1 through tube 2 as described. The gas stream containing inert gas and metal carbonyl gas causes a smooth, uniform agitation of the hydrocarbon solvent and unsaturated polymer.

Reactor 1 is operated above the boiling point of the metal carbonyl so that no excess carbonyl accumulates in the solvent-polymer solution. Desirably, a condenser 7 is attached to exit line 8 from reactor 1 in order to trap solvent vapors and allow the metal carbonyl and carbon monoxide vapors to pass through so the metal carbonyl can be recovered later in an ice bath.

On a laboratory scale, recovery of the metal carbonyl is not essential but on a commercial scale, it would probably be required. However, such recovery would be a simple operation. The excess carbon monoxide can easily be recycled to synthesize additional metal carbonyl or the combination inert gas-metal carbonyl-carbon monoxide vapor can be recycled directly into reservoir 6.

The advantages of using the synthesis method described above as compared with the techniques described in preceding applications may be summarized as follows:

(1) Greater reproducibility can be obtained.
(2) Particle size distributions are uniform.
(3) The particles have relatively short chains as demonstrated by small length to diameter ratios.
(4) Magnetic properties, particularly the $B_{remanence}/B_{maximum}$ ratio, are enhanced.
(5) Light modulating properties are markedly improved.
(6) No polar solvent ingredient is required.
(7) The concentration of active material in the products is increased.
(8) There is no tendency of the reaction products to sludge out.
(9) External agitation is not required.
(10) A magnetic field greater than that of the earth is not required.
(11) Excess metal carbonyl does not accumulate in the reactor but can be trapped externally.
(12) The excess of metal carbonyl required is greatly reduced.
(13) Relatively low molecular weight polymers such as polymers of butadiene having molecular weights as low as 1000 (viscosity average) may be used. The use of such low molecular weight polymers results in metal-organic polymers which have lower viscosities, higher concentrations of active material, as may be seen from the table, and a reduced tendency toward cross-linking which leads, in the case of the higher molecular weight starting materials, to sludge.

It will be understood that metal-containing polymers can be prepared which either have magnetic properties or which do not have magnetic properties depending on the choice of the particular reaction conditions and the choice of metal in the metal carbonyl which is used. As will be detailed later, the magnetic polymers usually have been prepared from a greater quantity of metal carbonyl and the metal of the carbonyl is generally iron, nickel or cobalt. As was disclosed in Serial No. 201,260, a stable, high molecular weight, unsaturated polymer can be reacted with a metal carbonyl where the metal is selected from a Group VIII transition metal to form metal carbonyl-containing elastomer complexes. These complexes are vulcanizable either alone or with other elastomers at accelerated curing rates to form superior vulcanizates. Also, the metal carbonyl complexed rubbery polymers can be cured with curing agents which would only give poor cures, at best, to the uncomplexed rubbery polymers. Furthermore, these metal complexed polymers exhibit exceptional heat stability at very high temperatures.

The magnetic polymers formed from the improved synthesis technique of the invention can be used as solids or in liquid form. They have utility as rubber reinforcing agents, catalysts, for making low density magnetic materials, for magnetic tape coating compositions, as magnetically and electrically responsive fluids and solids, magnetic printing inks, paint compositions, magnetic clutch liquids, magnetic coatings etc. The magnetic liquids of the invention will flow freely in the absence of a magnetic field, and if sufficient concentrations of the polymer are present, will become gelled or a rigid or a semisolid upon the application of a magnetic field, such as that induced by a surrounding coil in which an electric current flows. Upon removal of the magnetic field, the liquid will again be free flowing.

Using solutions of the magnetic material, thin films can be made in the normal manner. These films are attracted by a magnet. If these films are formed in the presence of a magnetic field, then the films are permanently magnetically oriented.

If one precipitates the metal-polymer in the normal manner, the resultant polymer is strongly attracted to a magnet. Similarly, if one precipitates it in the presence of a magnetic field, the polymer is magnetically oriented. This polymer can be molded in the usual manner.

The magnetic liquid may also be used for closed pumping systems, nondestructive ferrometal testing, magnetic control of viscosity, novel "read-in" techniques for computers, and coatings for paper, wood, and metals. The film is also useful for random access memory devices, microelectronic components, resistant heating devices, and metal adhesives.

In Serial No. 201,260, methods and techniques were shown for preparing polymers (metal polymer complexes) which, without further heat treatment, did not exhibit exceptional magnetic properties. In general, these polymers of Serial No. 201,260 contained one metal carbonyl group per pair of conjugated double bonds in the resulting polymers.

In order to obtain materials with magnetic properties, the polymers had to be pyrolyzed at temperatures above 100° C. for periods of from 10 minutes to 12 or more hours.

In Serial No. 332,302, it was disclosed that by using an excess of the metal carbonyl in the metal polymer preparation and by extending the duration of the treatment past the time required to secure metal complex formation, magnetic polymers could be obtained directly.

It was disclosed that it was believed that particles of pure metal were attached to and grew from the metal carbonyl groups located at the double bonds. It was also disclosed that the magnetic properties were greatly enhanced when the preparations of the magnetic materials were carried out in the presence of a magnetic field. The present synthesis technique eliminates the necessity for the magnetic field.

In Serial No. 201,260, the basic polymeric complex unit in the polymer was shown to be represented by the general formula,

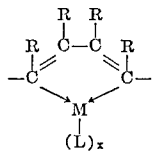

wherein M is a polyvalent heavy metal, particularly a transition metal such as iron, cobalt and nickel; R comprises a substituent group like hydrogen and hydrocarbons, particularly $C_1$ to $C_3$ alkyl groups and combinations thereof; L is an electron donating ligand group bonded directly to the metal atom such as carbonyls, hydrogen, hydrocarbons, and other ligand groups previously discussed; $x$ represents the number of ligand groups and, depending upon the metal and the number of electrons shared by the ligand groups with the metal, can be a number from 1 to 4, such as 1, 2, 3 or 4, usually 3.

The unsatisfied valence bonds of the polymeric complex unit $—R_4C_4ML_x—$ are satisfied by one or more of either other polymeric complex units as described, or by other ethylenically unsaturated or saturated hydrocarbon groups within the main or side chain, such as

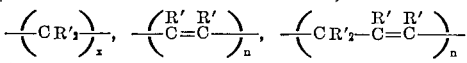

and the like wherein R' is a radical such as hydrogen and hydrocarbon radicals such as alkyl, aryl, alkylaryl, olefinic, cyclodiene radicals and $n$ is a number from 1 to 10, e.g., 2 to 8. Suitable examples include methylene, vinylene and vinylidene radicals. The complex unit can be interspersed within the other groups of the polymer in any combination such as in isolated, cumulative or conjugated positions. Of course, the ends of the polymer main or side chains and also the complex unit where the unit is on the end of the chain are terminated with the usual terminal end groups such as $CR'_3—$, $CR'_2=CR'—$ and hydrogen. The exact amount and nature of the complex unit distribution within the polymers depends on the type of polymer, the degree of ethylenical unsaturation before and after the reaction, and other factors within the selection or control of the formulator skilled in the art.

In SN. 201,260 is was disclosed that in the reaction between the polymer and the metal carbonyl compound, the isolated ethylenically unsaturated bonds are transposed to conjugate positions. For example, in the reaction between polybutadiene and iron carbonyl, the pair of remaining ethylenical bonds in two polymerized monomers is conjugated with the resulting structural formula of,

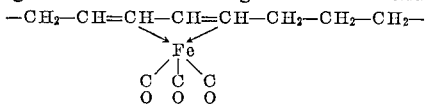

with the unsatisfied valences satisfied as before by the remaining portion of the polybutadiene structure such as by $C_4H_6$ groups or multiples thereof or by terminal groups such as $C_4H_7$ groups. The polybutadiene complex unit was also generally represented in SN. 201, 260 as,

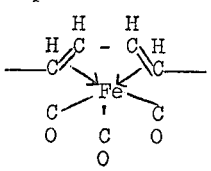

The method of the instant invention gives particles which, together with polymer, are associated into relatively short chains. One of the advantages of this invention is that shorter chains (less sludging) can be obtained than by the methods described in the other patent applications. This phenomenon is possible only when the polymer contains complexed metal carbonyl groups. It is believed that the metal particles are held to the polymer chain through these groups. Iron carbonyl is the preferred carbonyl reactant. The basic polymeric complex unit in the polymers of the instant invention when iron carbonyl is used is believed to be represented by the formulae,

I

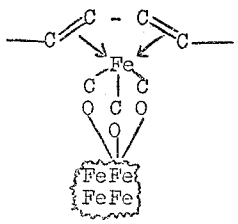

or,

II

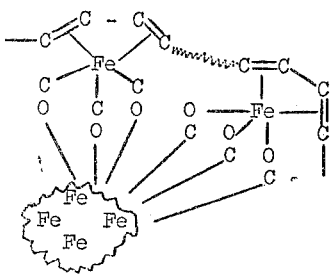

or by similar structures involving association of more than two complexed $Fe(CO)_3$ groups or more than one polymer chain with a given iron particle.

It is believed that the majority of the bonds from the carbonyl group to the metal is C—Fe bonds.

It can be seen that several additional Fe atoms form in a cluster on the internal iron carbonyl group or groups. This is referred to herein as "clumping." There can be as few as sixteen iron atoms and as many as one hundred million in each "clump." The iron atoms are said to form "clumps" which are actually small polycrystalline iron particles. By processes of aggregation, the iron particles and their associated polymer are formed into the chains observed. Although Fe is shown, any metal capable of forming a metal carbonyl as disclosed later can be substituted in the formula resulting in an analogous or similar structure depending on the valence and other chemical characteristics of the particular metal used. Also, the metal associated with the unsaturation in the polymer can be dissimilar to the metal in the clumps.

It is not certain whether the formula is precisely either I or II, but it is probably a polymer chain or chains with subtended iron particles as shown schematically according to the following:

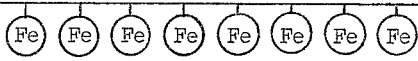

Of course, the chain may well be coiled so that the iron particles are completely surrounded by the hydrocarbon portion of the polymer. Furthermore, several such chains may be aggregated into much longer and larger units. The presence of the chains imparts unusual magnetic properties. It is well-known that elongated fine particles have superior magnetic properties (I.S. Jacobs & C.P. Bean, Physical Review, 100, 1060 (1955)). The chain-like aggregates of iron particles effectively act as elongated single particles. It is clear that the attachment of the particles to the hydrocarbon chain occurs via the complexed $Fe(CO)_3$ units of Serial No. 201,260.

In the art, hydrocarbon diene monomers have been reacted with iron carbonyls to give monomeric organometalic products. These products have limited utility due to the varying stability characteristics of these products. Further, from the structural formulae proposed, these products are incapble of polymerization without destruction without destruction of the metal-monomeric complex structure which structure depends upon the particular conjugate unsaturation of the monomers. For example, butadiene has been reacted with iron pentacarbonyl to give a product of the formula $C_4H_6Fe(CO)_3$, butadiene iron tricarbonyl.

Iron carbonyls and their derivatives have also been employed as catalysts in catalytic amounts to accelerate polymerization and other reactions. For example, iron pentacarbonyl has been used in amounts of 10 weight percent or less with oily polybutadiene to accelerate further polymerization. The polymerization is normally carried out in oxidizing atmosphere or in the presence of oxidizing agents or conditions to produce viscous, gelled, or hard polymerization products of limited oil solubility and incapable of further polymerization or vulcanization reactions.

The metal carbonyl polymer complexes of Serial No. 201,260 are prepared by contacting the ethylenically unsaturated polymer either in bulk or in solution with the desired metal carbonyl compound in a nonoxidizing atmosphere or under nonoxidizing conditions. The quantity of the metal carbonyl to be employed depends in part upon the degree of unsaturation of the polymer and the desired amount of metal to be complexed with the polymer together with the desired characteristics and the proposed utility of the complexed polymers produced. The maximum quantity of metal carbonyl that can be complexed with the polymer can be determined stoichiometrically by the degree of polymer unsaturation, since each pair of carbon-to-carbon ethylenically unsaturated bonds is capable of complexing one mole of metal. Of course, the reaction can be carried out in situ during the polymerization, copolymerization, or the dehydrogenation of a polymer or its monomers; and the reaction can be carried out with less than stoichiometric quantity of the metal carbonyl, where a high metal content is undesirable or not required. Regardless of the quantity of metal carbonyl employed, subsequent vulcanization or curing of the metal carbonyl complexed polymer can be accomplished, whether there exist complex, conjugated, unsaturated bonds or free, unsaturated bonds in the polymer.

The weight percent of metal carbonyl used in this invention will depend on the degree of unsaturation of the polymer and the molecular weight of the polymer. These concentration limits for the complex of Serial No. 201,260 were generally expressed as at least 0.15 to 2.50 or from 0.25 to 2.50, e.g., 0.40 to 1.5, moles of metal carbonyl per mole of ethylenical unsaturation in the polymer for preparation of the complex of Serial No. 201,260. The quantity of the metal carbonyl and metal complexed with the polymer is usually determined by analysis of the infrared spectra of polymer samples or by conventional combustion analysis methods. For preparation of the magnetic materials of this invention, the carbonyl is used in excess which need not be as large as the excess for Serial No. 332,302. For instance, from 0.1 to 100, preferably 0.5 to 50, and most preferably about 2 to 20 parts by weight of metal carbonyl per part of polymer can be used.

These quantities for the reaction in Serial No. 332,302 were expressed as 2 to 55, preferably 2.51 to 55, more preferably 11 to 41, and most preferably 23 to 32 moles of metal carbonyl per mole of ethylenic unsaturation. For purposes of the present invention, they can be expressed as 0.027 to 27, preferably 0.14 to 14 and most preferably 0.54 to 5.4 molar proportions of metal carbonyl per ethylenic unsaturation in the polymer. Moreover, the final metal organic polymeric product will have in the range of from 0.1 to 10, preferably 0.1 to 5 and more preferably 0.4 to 3 molar proportions of metal per mole of ethylenic unsaturation in the starting polymer.

In general, the reaction between the metal carbonyl and the polymer to form the complex polymer or between the metal carbonyl and the complex polymer proceeds over a wide range of temperatures, preferably about 50° to 250° C., but efficient reaction rates require elevated temperatures of over 70° C. with temperatures of 80° to 200° C., generally preferred. For iron carbonyl, the temperature is preferably from about 140° to 200° C. For cobalt carbonyl or nickel carbonyl, temperatures of 50° to 120° C. are satisfactory.

The reaction may be carried out at elevated temperatures with the polymer in bulk or in solution, e.g., in hydrocarbon solvents.

The time for the completion of the complexing reaction to form the product of Serial No. 201,260 depended, as described in Serial No. 201,260, upon the reaction temperature selected, the metal carbonyl employed, the amounts of reactants, and other preselected reaction conditions. The time could vary from one hour to 72 hours, e.g., 2 to 24 hours. For the magnetic polymer clumping reaction of the instant invention, the time is from 1 to 120 hours, preferably 10 to 96 hours, and most preferably about 12 to 50 hours.

It is to be noted that although the synthesis process of the instant invention can be used to produce the complex polymer of Serial No. 201,260, the technique of Serial No. 201,260 is preferred. However, the process of the instant invention for producing polymers with clumps is preferred over the process of Serial No. 332,302.

It is possible to add the metal carbonyl alone in its gaseous form either as a gas or sublimate vapor. For this approach, a liquid-gas or solid-gas contacting means such as a sparger beneath the surface of the polymer solvent solution can be employed, or column contacting means whereby a stream of metal carbonyl gases is employed in a current or countercurrent direction to the polymer or polymer-containing solution can be used. These alternate processes are not as satisfactory as the inert gas technique which forms the preferred version of this invention.

The starting polymers employed are those homo or copolymers containing some degree of carbon-to-carbon ethylenical unsaturation. The unsaturation may be either in the main chain of the polymers such as present in head-to-tail polymerization methods, and as characterized by natural and synthetic elastomers like butyl rubber, or in the side chains of the polymers such as present in 1,2 polymerization as characterized by vinyl polybutadiene and 3,4 addition in polyisoprene. The ethylenically unsaturated bonds can also be present in both the main and the side polymer chains.

The degree of unsaturation of the polymers may vary between 0.5 to 99.5 mole percent such as between 0.5 and 50 mole percent, e.g., 1 to 30 or 1 to 10 mole percent, for those low unsaturated polymers and between 50 and 99 mole percent, e.g., 50 to 85 or 60 to 80 mole percent, for those highly unsaturated polymers.

The unsaturated linkages in the polymer can be conjugated, isolated, or cumulative, or any mixture or combination of these structural arrangements. The polymers prior to the complexing reaction can be partially vulcanized with conventional curing agents or copolymerized with other polymerizable monomers or polymers provided only that at the time of reaction with the metal carbonyl compound there remains some degree of carbon-to-carbon, ethylenical unsaturation within the polymer chain or molecule.

The polymers within the scope of the instant discovery may be broadly characterized as those ethylenically unsaturated polymers having an average molecular weight of from 1,000 to 3,000,000, preferably 100,000 to 80,000, most preferably 100,000 to 300,000, or higher or lower, and having Wijs iodine numbers of from 1 to 600, e.g., 1 to 50, for the low unsaturation polymers and over 100, e.g., 200 to 400, for the highly unsaturated polymers. All molecular weights are viscosity-average unless otherwise indicated.

Particularly suitable polymers and elastomers include those ethylenically unsaturated hydrocarbon rubbery polymers capable of cross-linking or vulcanization and being elastic in character. Nonlimiting examples of unsaturated polymers suitable for the purposes of the invention include:

(1) Copolymers containing a major amount of an isoolefin and a minor amount of a multiolefin. These copolymers are commonly known as "butyl rubber" with their preparation and uses being described in U.S. Patent 2,356,128 to Thomas et al. This rubber normally comprises from about 85 to 99.5 weight percent of a $C_4$ to $C_8$ isoolefin such as isobutylene, or a $C_1$ to $C_3$ alkyl substituent like 2-methyl-1-butene, and from 0.5 to 15.0 weight percent of a $C_4$ to $C_{14}$ multiolefin or preferably a $C_4$ to $C_6$ multiolefin such as dimethylallyl, a cyclic diene like cyclopentadiene and cyclohexadiene, or more preferably a conjugated diene like isoprene, 1,3-butadiene, or a hydrocarbon substituted, e.g., an alkyl substituted, conjugated diene like dimethyl butadiene and the like. The rubbery reaction product of isobutylene and isoprene is particularly preferred. These butyl rubber polymers described commonly have Wijs iodine numbers of from 1 to 50 and from 0.5 to 10.0 mole percent unsaturation.

(2) Copolymers of a diene and a vinyl aromatic generally known as GR-S or SBR type rubbers commonly made by copolymerizing from 30 to 80 weight percent of a $C_4$ to $C_8$ conjugated diene such as butadiene, isoprene, or a cyclic diene such as cyclopentadiene or cyclohexadiene and a hydrocarbon substituted, e.g., an alkyl substituted, diene such as dimethyl butadiene with from 70 to 20 weight percent of a vinyl aromatic such as styrene, dimethyl styrene and alkyl substituted vinyl aromatics like divinyl benzene and the like, the preferred copolymer being that reaction product of about 70 to 80 weight percent of butadiene with about 20 to 30 weight percent of styrene.

(3) Polydienes such as those hydrocarbon polymers prepared by the homopolymerization of conjugated dienes like butadiene, isoprene, cyclic dienes like cyclopentadiene and their hydrocarbons and particularly $C_1$ to $C_3$ alkyl substituted dienes.

(4) Copolymers prepared by copolymerizing major amounts of from 50 to 98 weight percent, e.g., 60 to 80 wt. percent, of a $C_4$ to $C_8$ cyclic or straight chain diene such as butadiene, isoprene, cyclopentadiene, hexadiene and the like with minor amounts of from 2 to 40 weight percent of a $C_2$ to $C_6$ monoolefin like ethylene, propylene, diisobutylene, isobutylene, pentene and the like.

(5) Natural rubber and natural rubber latexes such as those natural elastomeric products derived from the latex of the Hevea and Ficus species. These products are characterized by a high level of unsaturation, rubbery like characteristics and commonly have Wijs iodine numbers of above 200, such as from 200 to 400 or even higher.

These copolymers and homopolymers described above may be copolymerized further with minor amounts, such as from 1 to 30 wt. percent of organic polymerizable monomers or other polymerizable polymers containing one or more vinyl, vinylene, or vinylidene groups such as vinyl aromatics like styrene, divinyl benzene; vinyl cyanides like acrylonitrile, ethacrylonitrile; vinyl esters like the vinyl esters of short chain fatty acids, e.g., vinyl acetate, long chain fatty alcohol esters of acrylic acid and $C_1$ to $C_3$ alkyl substituted acrylic acid; halogenated vinyl compounds like vinylidene chloride, vinyl chloride, chloroprene, ethylene dichloride and the like.

The polymer types described above with the exception of the butyl rubber are commonly referred to as high unsaturation polymers having at least 30 mole percent of unsaturation such as from 50 to 99 mole percent unsaturation.

Unsaturated polymers and particularly those polymers described above can be reacted with the desired metal carbonyl either in bulk or in solution. In order to assure a rapid reaction rate and intimate contact of the metal carbonyl with the polymer by mixing or agitation during the course of the reaction, it is preferred that the polymer be dissolved in an inert organic solvent. Those polymers having molecular weights of below 50,000 often have viscosity low enough to permit the bulk polymer to be used. Those polymers of higher molecular weight and especially those above 100,000 usually require solvation to obtain suitable handling and mixing characteristics. These polymers may then be used in solvents at varying proportions, while very high molecular weight polymers such as above 200,000 are commonly employed in solutions of not more than 20 weight or 10 weight percent such as from 1 to 6 wt. percent.

It is preferred for the high molecular weight polymers that low concentrations of high molecular weight polymer in solvent be used, that is, from 0.5 to 25 grams, preferably 1 to 10, most preferably 1 to 5 grams of polymer per 100 ml. of solvent. Satisfactory magnetic polymers of the invention have been prepared using starting polymer concentrations as low as 0.005 gram/100 ml. of solvent. A satisfactory general range of polymer in solvent at the start of the reaction will be from 0.01 wt. percent to 75 wt. percent with 0.5 wt. percent to 20 wt. percent being preferable.

Suitable solvents to be employed in effecting solvation include, but are not limited to, dioxane, aliphatic and aromatic hydrocarbons like benzene, toluene, xylene, hexane, heptane, petroleum naphtha, cyclohexane, and the like, ethers such as tetrahydrofuran, 1,2-dimethoxyethane, bis(2-methoxyethyl) ether and the like; ketones like acetone, acetylacetone, methylethyl ketone, methylisobutyl ketone, cyclohexanone and the like; carbon disulfide and mixtures thereof.

This invention is applicable to any unsaturated polymers or elastomers regardless of the method of polymerization employed to obtain the original starting polymer. Thus, the instant process can be profitably employed with those unsaturated polymers normally prepared by the use of heavy metal-organo metal catalysts such as aluminum alkyl-titanium halide systems, for example, the aluminum-triethyl-titanium tetrahalide system referred to as Ziegler catalysts or with metal alkyl-cobalt salt complex systems, as well as with alkali metal catalysts like alkyl-lithium or lithium metal catalysts or with a Friedel-Crafts catalyst like aluminum chloride, boron trifluoride and the like, as well as with those polymers commonly prepared by organic or inorganic free radical initiators or anionic or cationic emulsion polymerization techniques or any other methods.

Many such processes are described in Preparative Methods of Polymer Chemistry, by W. Sorenson and T. W. Campbell, Interscience Publishers, New York (1961), while many of the polymers such as butyl rubber and GR-S are described in greater detail in Synthetic Rubber, by G. S. Whitby, J. Wiley & Sons, Inc., New York (1954).

The metal carbonyls suitable for the purposes of this invention include carbonyls of Cr, Mo, Mn, Fe, Co, Ni, Ru, Rh, Os, Ir, especially carbonyls of polyvalent heavy metals and particularly those Group VIII transition metal carbonyls of iron, cobalt and nickel and their substituted derivatives, and combinations and mixtures thereof. Of particular preference are iron carbonyl compounds due to their availability, relatively low cost, stability and low toxicity characteristics. The metal carbonyl employed can be in monomeric or polymeric form, substituted or unsubstituted, with those stable unsubstituted carbonyls and hydrocarbon substituted carbonyls, especially those containing at least two replaceable carbonyl groups, being of particular significance. A mixture of two or more carbonyl compounds of the same or different metals may be simultaneously employed as in the preparation of mixed metal-polymers.

The inert gas, which contacts the carbonyl, preferably contacts the carbonyl when it is in liquid form but the carbonyl can also be a gas or a solid or can be a solution of liquid or solid carbonyl in a suitable solvent. Since many carbonyls sublimate, the inert gas can contact these carbonyls in their solid form and cause sublimation to a vapor which can be picked up by the inert gas for conveyance to the reaction.

It is preferred that the intermediate metal complex polymer be prepared from an iron carbonyl if it is to be an intermediate for the ultimate synthesis of magnetic polymers and nonmagnetic metal-organic polymers. Carbonyls containing other metals besides iron can then be added to the complex so that an iron carbonyl is at the unsaturated site and other metals such as those listed above are "clumped" in groups on the iron carbonyl. These other metals should be either nickel or cobalt if the clumped polymer is to have magnetic properties. However, it is possible to form clumps of other metals or mixtures of metals to form metal polymers analogous to the magnetic polymers but which do not have magnetic properties.

Nonlimiting examples of suitable metal carbonyl compounds include those monomeric, dimeric, trimeric and tetrameric carbonyls having from 4 to 12 carbonyl groups, e.g., 4 to 8 carbonyl groups, wherein the carbonyl groups are bonded directly to the metal such as those unsubstituted metal carbonyls like iron pentacarbonyl, di-iron nonacarbonyl, tri-iron dodecacarbonyl, dicobalt octacarbonyl, tetracobalt dodecacarbonyl, nickel tetracarbonyl and the like.

Suitable substituted metal carbonyls include those carbonyls having one or more substituent groups or electron donating ligands bonded to the metal atom of the carbonyl compound such as hydrocarbon groups like unsaturated hydrocarbons like butadiene, 1,3-octadiene, acetylene, propylene, alicyclic conjugated dienes like cyclopentadiene, cyclooctatetraene, $C_1$ to $C_3$ alkyl substituted cyclopentadiene and the like. Nonlimiting examples of substituted carbonyls include 1,3-butadiene-iron tricarbonyl, cyclooctatetraene-iron tricarbonyl, cyclopentadienyl cobalt dicarbonyl, dicyclopentadienyl di-iron tetracarbonyl, acetylene dicobalt hexacarbonyl and the like, and combinations thereof.

A further class of suitable carbonyl compounds includes the neutral and anionic metal carbonyl hydrides wherein one, two, three, four or more hydrogens, as well as carbon monoxide, are bonded directly to the metal, or a combination of hydrocarbons, carbon monoxide and other ligand substituents are bonded directly to the metal as well as the hydrogen. Suitable transition metal carbonyls include the neutral cobalt tetracarbonyl monohydride $HCo(CO)_4$, the neutral iron tetracarbonyl dihydride $H_2Fe(CO)_4$, the anionic bis iron octacarbonyl monohydride $[HF_2(CO)_8]^-$, the anionic tris iron undecacarbonyl monohydride $[HFe_3(CO)_{11}]^-$, the anionic iron tetracarbonyl monohydride and the like. Also suitable for the purposes of this invention are the neutral salts of the anionic metal carbonyl hydrides. Suitable basic or neutralizing reagents for reaction with the anionic metal carbonyl hydrides include the alkali, alkaline earth and heavy metal oxides and hydroxides, ammonia, amines, such as fatty acid amines, alkyl amines like ethyl amine, polyamines like alkylene diamines, hydroxy amines, quaternary ammonium hydroxides and the like. An example of a suitable neutral slat formed by the reaction of an alkyl amine with the anionic metal hydride carbonyl would be $[C_2H_5NH]^+ [HFe_3(CO)_{11}]^-$.

Other nonlimiting examples of mixed metal carbonyl hydrocarbon hydrides include, for example, cyclopentadienyl iron dicarbonyl hydride, butadiene cobalt carbonyl hydride. Other suitable ligands include phosphines like triphenyl phosphine, arsines, amines, halides, isonitriles, cyanides and the like.

The invention is further illustrated by the following example.

EXAMPLE

A series of 17 runs was carried out according to the improved synthesis of the invention. The first 15 of these runs resulted in magnetic materials. The 16th and 17th runs resulted in materials which did not have magnetic properties. These runs were carried out according to the following procedure.

A solution of the starting unsaturated polymer in an appropriate hydrocarbon solvent was charged into a cylindrical reactor of approximately three-inch diameter and one-liter capacity.

A thermometer extended into the liquid. A Thermo-Watch temperature controller was placed on the thermometer and connected through a Variac to a Tecam fluidized, sand-bath heater, in which the reactor was immersed, so that the liquid contents' level was below the level of the sand. A glass tube with a sintered glass tip for gas dispersion extended to the bottom of the reactor. This tube was connected by flexible tubing to an external, unheated reservoir of iron pentacarbonyl, which was shielded from light. A glass tube with sintered glass gas-dispersing tip extended to the bottom of the iron pentacarbonyl reservoir.

Nitrogen at a pressure of 10 p.s.i. and flow rate of 160 cc./min. was blown through the iron carbonyl, and the carbonyl-carrying gas was then conducted into the bottom of the reactor. The gas stream caused smooth, uniform agitation of the liquid. Some of the iron carbonyl decomposed to form the various desired products. Since the reactor was operated well above the boiling point (104°) of iron pentacarbonyl, no excess accumulated in the solution.

A condenser was attached to the reactor to retain solvent, but the iron carbonyl vapors passed by and could have been trapped later at low temperatures, e.g., in a water/ice bath. It is clear that further optimization of process times, temperatures, partial pressures, and concentrations will be apparent to one skilled in the art. For instance, increased pressure and temperature should permit a shorter duration of reaction. Nonoxidizing gases such as helium, hydrogen, argon, carbon monoxide, or carbon dioxide, can be used to replace the nitrogen as a carrier gas. The particular reaction conditions and the results obtained in the various runs are summarized in the following table.

TABLE

| Run No. | Polymer Concentration | Solvent [k] | Temp., °C. | Hrs. Reacted | Ml. $Fe(CO)_5$ [e] | In Products G./ml. solids [f] | In Products G./ml. Fe [g] | G. $Fe(CO)_5$ Employed Total | G. $Fe(CO)_5$ Employed G./g. polymer |
|---|---|---|---|---|---|---|---|---|---|
| 1 | 2% Buton 150 [a] | Diethylbenzene | 150 | 18 | 36 | 0.069 | 0.033 | 53 | 7.3 |
| 2 | 10% Buton 150 | ----do---- | 150 | 50 | 85 | 0.193 | 0.074 | 125 | 3.5 |
| 3 | 50% Buton 150 | Xylene | 150 | 52 | 88 | 0.678 | 0.067 | 129 | 0.71 |
| 4 | 10% Buton 150 | Decalin | 150 | 42 | 50 | 0.162 | 0.038 | 73 | 2.0 |
| 5 | 0.5% Buton 150 | Diethylbenzene | 150 | 19 | 23 | 0.019 | 0.007 | 34 | 19 |
| 6 | 5% Buton 150 | Cumene | 150 | 49 | 75 | 0.138 | 0.056 | 110 | 6.1 |
| 7 | 10% Buton 100 [b] | ----do---- | 150 | 48 | 60 | 0.201 | 0.052 | 88 | 2.4 |
| 8 | 0.5% Cis-4 [c] | Diethylbenzene | 150 | 17 | 20 | 0.019 | 0.006 | 29 | 16 |
| 9 | 1% Cis-4 | ----do---- | 160 | 20 | 32 | 0.036 | 0.018 | 47 | 13 |
| 10 | 1% Cis-4 | ----do---- | 170 | 24 | 43 | 0.044 | 0.018 | 63 | 17 |
| 11 | 3% Cis-4 | ----do---- | 150 | 20 | 32 | 0.048 | 0.019 | 47 | 4.3 |
| 12 | 0.5% Cis-4 | Decalin | 150 | 20 | 32 | 0.024 | 0.014 | 47 | 26 |
| 13 | 2% Cis-4 | Diethylbenzene | 150 | 51 | 76 | 0.087 | 0.051 | 111 | 15 |
| 14 | 1.0% SBR [d] | ----do---- | 150 | 21 | 35 | 0.049 | 0.027 | 51 | 14 |
| 15 | 0.5% natural rubber | ----do---- | 150 | 19 | 22 | 0.038 | 0.022 | 32 | 18 |
| 16 | 3.0% Cis-4 [j] | Cumene | 135 | 17 | 20 | (l) | (l) | 29 | 2.7 |
| 17 | 3.0% Cis-4 [j] | Cumene plus 5% 2-octanone | 135 | 17 | 25 | (m) | (m) | 37 | 3.4 |

| Run No. | G. $Fe(CO)_5$ Utilized (consumed) Total | G. $Fe(CO)_5$ Utilized (consumed) G./g. Polymer | Percent Efficiency | Description of Products G. Fe/g. of Initial Polymer | Description of Products G. atom Fe/ G. mole $C_4H_6$ | $H_C$ [h] | $B_R/B_M$ [h] | Percent Modulation [i] | Percent Frequency Response [i] |
|---|---|---|---|---|---|---|---|---|---|
| 1 | 42 | 5.8 | 81 | 1.6 | 1.7 | 230 | 0.92 | 1.8 | 68 |
| 2 | 93 | 2.6 | 74 | 0.74 | 0.76 | 290 | 1.0 | 15.2 | 38 |
| 3 | 84 | 0.47 | 66 | 0.13 | 0.14 | 240 | 0.94 | 0.6 | 78 |
| 4 | 48 | 1.3 | 63 | 0.38 | 0.39 | 260 | 0.90 | 1.6 | 85.0 |
| 5 | 8.8 | 4.9 | 26 | 1.4 | 1.4 | 280 | 0.78 | | |
| 6 | 71 | 3.9 | 64 | 1.1 | 1.2 | 230 | 0.90 | 0.68 | 80 |
| 7 | 66 | 1.8 | 76 | 0.52 | 0.54 | 240 | 0.87 | 1.1 | 78 |
| 8 | 7.6 | 4.2 | 26 | 1.2 | 1.2 | 240 | 0.75 | 0.13 | 25 |
| 9 | 23 | 6.3 | 48 | 1.8 | 1.9 | 220 | 0.88 | 4.0 | 37 |
| 10 | 23 | 6.3 | 37 | 1.8 | 1.9 | 230 | 0.85 | 3.6 | 26.4 |
| 11 | 24 | 2.2 | 52 | 0.63 | 0.65 | 220 | 0.86 | 0.21 | 31.3 |
| 12 | 18 | 10 | 38 | 2.8 | 2.9 | 260 | 0.86 | 2.3 | 16 |
| 13 | 64 | 8.9 | 59 | 2.5 | 2.6 | 230 | 0.95 | 1.7 | 67 |
| 14 | 34 | 9.4 | 67 | 2.7 | 2.8 | 220 | 0.89 | 0.30 | 37.5 |
| 15 | 28 | 15 | 86 | 4.4 | 4.5 | 250 | 0.86 | 8.5 | 20.5 |
| 16 | | | | | | | | | |
| 17 | | | | | | | | | |

[a] Buton 150—a product of the Enjay Chemical Company, polybutadiene of mol. wt. 2,300.
[b] Buton 100—a product of the Enjay Chemical Company, styrene-butadiene copolymers of mol. wt. 2,300.
[c] Cis-4—a product of the Phillips Petroleum Company, polybutadiene, 95% Cis-1,4 units, mol. wt. 246,000.
[d] SBR—a styrene-butadiene copolymer, mol. wt. 150,000.
[e] Actual consumption much less than this, due to excess swept out in vapor phase.
[f] Occasionally high, due to difficulty in freeing entrapped solvent.
[g] By combustion analysis.
[h] Parameters indicating permanent magnetic characteristics, disclosed in S.N. 332,302.
[i] Parameters indicating suitability for light modulation, disclosed in S.N. 336,339.
[j] Precipitated in acetone-sulfuric acid; purified by chromatography of cement on silica gel; reprecipitated for analysis.
[k] 360 ml.
[l] Nonmagnetic—Percent Ash=12.12, corr. to 21 mole percent $C_8H_{12}Fe(CO)_3$.
[m] Nonmagnetic—Percent Ash=12.35, corr. to 21 mole percent $C_8H_{12}Fe(CO)_3$.

It can be seen from the above table that very satisfactory magnetic polymers can be prepared using only a small excess of iron carbonyl. Moreover, Runs 16 and 17 demonstrate that polymer complexes of the type disclosed in Ser. No. 201,260 can also be prepared by the technique of the instant invention, although as pointed out above the technique of Ser. No. 201,260 is at the present time the preferred technique for these complexes.

Although the invention has been described with a certain degree of particularity, it will be understood that minor modifications and changes can be made therein without departing from the spirit of the invention as hereinafter claimed.

What is claimed is:

1. An improved process for preparing metal-containing polymers which comprises the steps of:
   (a) providing a mixture of a gaseous metal carbonyl with an inert gas, said metal being selected from the group consisting of Cr, Mo, Mn, Fe, Co, Ni, Ru, Rh, Os and Ir,
   (b) conveying said mixture to a reaction vessel containing an ethylenically nonconjugated high unsaturated polymeric material having a viscosity average molecular weight of at least 1000,
   (c) introducing said gaseous mixture into said reaction vessel so as to cause agitation of said polymeric material within said reaction vessel,
   (d) contacting said polymeric material with said gaseous mixture of metal carbonyl and inert gas at a temperature above the boiling point of said metal carbonyl, and
   (e) reacting said polymeric material with 0.15 to 55 moles of said carbonyl per mole of ethylenic unsaturation in said polymeric material sufficiently to form a metal-containing polymer.

2. A method according to claim 1 wherein said contacting is carried out for a time period of from about 2 to 120 hours and wherein from 0.027 to 27 molar proportions of metal carbonyl per mole of ethylenic unsaturation in the polymer are contacted with said polymer at a temperature of from 50° to 250° C.

3. A process according to claim 2 wherein said polymer is dissolved in a solvent to produce a solution which contains from 0.5 to 50 wt. percent of polymer.

4. A process according to claim 2 wherein said inert gas is nitrogen.

5. A process according to claim 2 wherein said polymer is polybutadiene.

6. A process for preparing metal-containing polymers which comprises the steps of:
   (a) contacting an unsaturated polymeric butadiene material having a viscosity average molecular weight of at least 1000 with a mixture of a metal carbonyl selected from the group consisting of Cr, Mo, Mn, Fe, Co, Ni, Ru, Rh, Os and Ir carbonyls and inert gas at a temperature above the boiling point of the metal carbonyl, wherein said contacting is effected in such a manner as to cause agitation of said butadiene material, and
   (b) reacting said polymeric butadiene material with from 0.027 to 27 molar proportions of carbonyl per mole of ethylenic unsaturation in said polymer to form a metal-containing polymer, wherein said contacting so as to cause agitation is carried out for a time period of from 2 to 120 hours, wherein said polymer contains at least 0.1 g. of metal/g. of hydrocarbon polymer to 10 g. of metal/g. of hydrocarbon polymer, wherein said reaction is carried out at a temperature of from 50° to 250° C., wherein said polymer is dissolved in a solvent to result in a solution which contains from 0.5 to 50 wt. percent of polymer, wherein said solvent is an aromatic hydrocarbon selected from the group consisting of benzene and alkyl substituted benzenes wherein said alkyl substituents comprise from 1 to 4 carbon atoms and wherein said inert gas is nitrogen.

7. A process according to claim 6 wherein said metal is iron.

References Cited by the Examiner

UNITED STATES PATENTS

| | | | |
|---|---|---|---|
| 1,891,203 | 12/1932 | Ambros et al. | 260—94.2 |
| 2,409,167 | 10/1946 | Veltman | 260—439 |
| 2,985,686 | 5/1961 | Bueche | 203—92 |

OTHER REFERENCES

Barron: "Modern Synthetic Rubbers," 2nd edition, Van Nostrand Company Inc., 1944, pages 131–132.

JOSEPH L. SCHOFER, *Primary Examiner.*

C. R. REAP, H. I. CANTOR, *Assistant Examiners.*